Oct. 9, 1956 J. ADAMS, JR., ET AL 2,766,159
BELT CONSTRUCTION, INCLUDING A PLEATED FABRIC COMPONENT
Filed June 1, 1953 2 Sheets-Sheet 1

Inventors:
James Adams, Jr.
George R. Lederer
George Marton, Jr.
By Gary, Desmond & Parker
Attys.

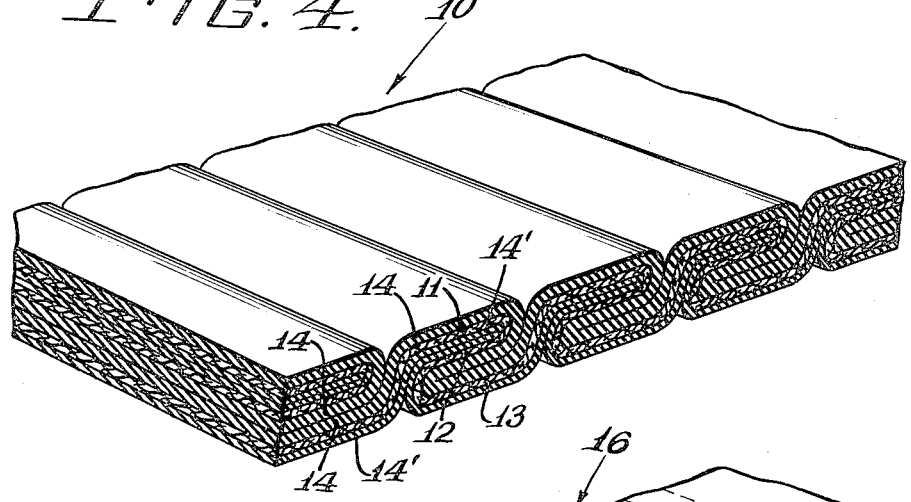
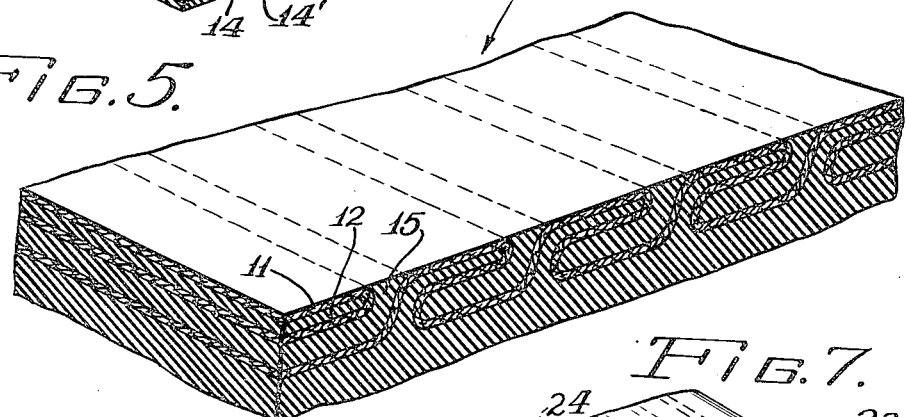
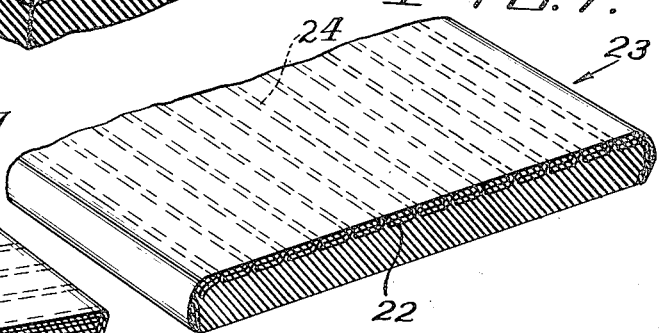
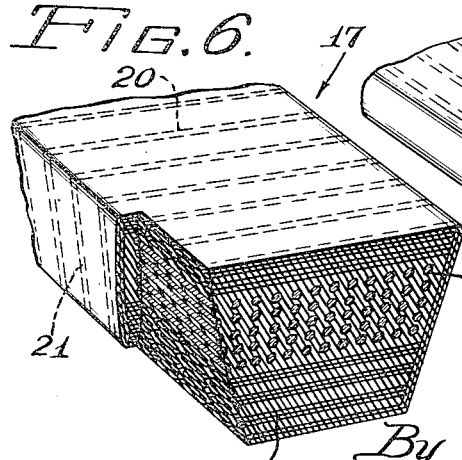

United States Patent Office 2,766,159
Patented Oct. 9, 1956

2,766,159

BELT CONSTRUCTION, INCLUDING A PLEATED FABRIC COMPONENT

James Adams, Jr., George R. Lederer, and George Marton, Jr., Passaic, N. J., assignors to Raybestos-Manhattan, Inc., Passaic, N. J., a corporation of New Jersey Application June 1, 1953, Serial No. 358,682

8 Claims. (Cl. 154—52.1)

This invention relates to improvements in the construction of belts of both the power transmission type and the conveyor type and refers particularly to a component for said belts which comprises a pleated fabric, the pleated fabric component being employed as either a cover for the belt or a reinforcement therefor, or both.

It has been found that the least durable component of a belt, either of the power transmission type or the conveyor type, comprises the cover. The cover of the belt is subjected to abrasive wear and tear and when the belt is trained around pulleys the continuous flexing and unflexing of the belt subjects the cover to severe compressive and tensile stresses. These combined abrasive, compressive and tensile stresses usually cause the cover to fail while the remaining components of the belt still possess a long potential life.

As a feature of the present invention a belt component is contemplated which has been found to be ideally adaptable for use as a cover. The component comprises a fabric, either of the woven or weftless type, which may be saturated or coated with rubber or a rubber composition, and which may be pleated, the pleated fabric being disposed upon some or all of the surfaces of the belt body before pressing and vulcanization whereby the pleated fabric becomes a cover for the belt substantially integrally united to belt body.

In the case of power transmission belts the pleated fabric may be so positioned on the belt as to have the pleats run either transverse or on the bias with respect to the length of the belt whereby when the belt is passed around a pulley the areas of juncture between adjacent pleats function as yield areas. The yield areas thus formed are particularly effective where the cover, when the belt is wrapped around a pulley, is subjected to tension since said yield areas permit elongation of the cover without subjecting the fabric of the cover to appreciable tension. Upon that side of the belt subjected to compression said hinges permit buckling along the lines of the yield areas rather than buckling the greater mass of the fabric between adjacent yield areas. Thus, the tensile and compressive stresses to which the fabric of a belt cover is normally subjected is, to a great extent, relieved or eliminated.

A greater cover thickness, of course, offers greater lateral or crosswise rigidity, which is desirable to prevent lateral buckling. However, the thickness of the cover, or the number of plies of fabric constituting a cover is limited since, heretofore, as the cover thickness was increased, the longitudinal stiffness of the belt was correspondingly increased, that is, its resistance to bending around pulleys was increased. Hence, the compressive and tensile stresses in the belt cover were intensified. Accordingly, the art has been faced with a dilemma relative to belt cover construction, that is, if the cover was designed for high lateral rigidity and strength its longitudinal stiffness was excessively increased; on the other hand, were the cover designed for high flexibility, its lateral rigidity would be low and flimsy.

The present invention provides, as hereinbefore set forth, a belt cover which is exceptionally flexible relative to bending stresses encountered when the belt wraps around a pulley. In addition, by employing a pleated fabric the major portion of the belt surface will be covered by the substantial equivalent of three plies of fabric which offers substantially three times the lateral rigidity of a single ply cover with greater flexibility than could heretofore be secured with a single ply cover.

When employing the present invention in conjunction with conveyor belts, the pleats may run longitudinally of the belt or on the bias whereby better troughing of the belt will be obtained with the added advantage of the increased abrasive resistance, hereinbefore described.

In addition to being used as a surfacing or covering for a belt, the pleated fabric may also function as a reinforcing component whereby strength may be imparted to the belt body, and depending upon the direction that the pleats are disposed, the belt may be made more flexible in one direction and stiffened in a direction at right-angles thereto.

As a further feature of the present invention, the pleated fabric particularly when used as a belt cover may comprise a fabric which, before pleating, may carry an equal mass of rubber or rubber composition coating on each side, or the coating on one side of the fabric may be thicker than the coating on the opposite side thereof. In the latter case, the pleats, when formed, will be characterized by being non-symmetrical, that is, the fabric plies comprising each pleat will be spaced differently from each other. Such a non-symmetrical arrangement of the plies comprising the pleats may be used to advantage, as will hereinafter more fully appear.

Other objects and advantages of the present invention will be apparent from the accompanying drawing and following detailed description.

In the drawing,

Fig. 4 is a fragmentary perspective view of the pleated component employed in the belt, the opposite faces of the belt being unequally coated.

Fig. 5 is a view similar to Fig. 1 wherein the pleated fabric illustrated in Fig. 4 is used as a cover.

Fig. 6 is a fragmentary perspective view partially in section showing the use of pleated components as a covering and also as being embedded in the thickness of the belt.

Fig. 7 is a fragmentary perspective view showing a transverse section of a conveyor belt having a pleated fabric cover, the fold of the pleats being parallel to the length of the belt.

Figure 1:
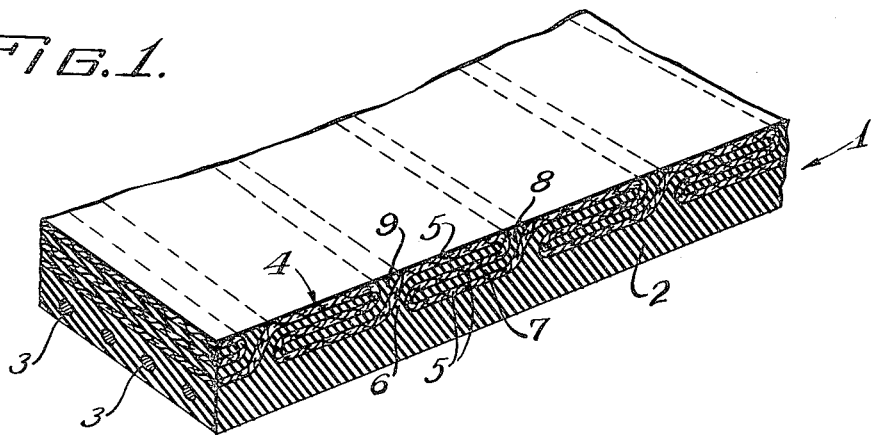
Fig. 1 is a fragmentary perspective sectional view of a portion of a flat power transmission belt wherein a pleated fabric cover is employed, the folds of the pleats being disposed transverse to the length of the belt and the opposite faces of the fabric being substantially equally coated.
Figure 2:
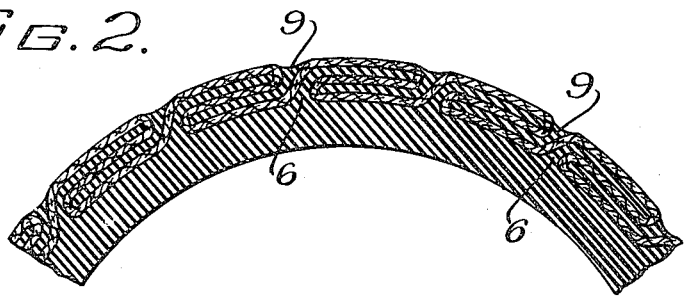
Fig. 2 is a fragmentary sectional view of the belt illustrated in Fig. 1 when the pleated cover is subjected to tension.

Referring in detail to the drawing, 1 indicates a portion of a flat power transmission belt, the body of which is constructed essentially of rubber or a rubber composition 2. The body of the belt has embedded therein strength or tension members 3 which may comprise relatively strong cords which extend lengthwise of the belt. Although the body of the belt 1 is shown and described as comprising a homogeneous rubber mass it is to be understood that the body may be made up of plied rubberized fabric sheets or the like. Similarly, although cord type strength members are shown and described the strength members may comprise wire strands or may comprise fabric or any other type of strength members which have heretofore been used.

The belt 1 is characterized by having a pleated fabric cover at one surface thereof. The pleated fabric 4 comprises a woven or weftless fabric which has been saturated or coated with a rubber or rubber composition material, the coating being applied equally to the opposite faces of the fabric. Although the pleated component 4 is shown as being of the side pleat type, the component may, if desired, be box pleated, or any other type of pleat so disposed as to make substantially three plies at spaced cross sections of the pleated component.

In applying the cover component 4, the body 2 of the belt with appropriate strength members 3 may be disposed in a suitable mold. The pleated fabric component 4 may be disposed over one or all of the surfaces of the belt body and the assembly may be pressed and vulcanized. During the pressing and vulcanizing operation a limited degree of flow of the plastic material comprising the belt body and that carried by the pleats takes place in and around the various pleats whereby the resulting cover is substantially integrally joined to the belt body.

By virtue of the flow of plastic material in and around the pleats and the merging of the plastic rubber material of the belt body with that carried by the pleats, coupled with the characteristic form or shape of the pleats, the fabric plies 5 comprising the pleats are interlocked or keyed in the body of the belt, as indicated at 6 and 7 in Fig. 1. Thus, the pleated component is joined to the belt body in a much more secure manner than could be an equivalent three plies of flat fabric material.

Further, since the plies 5 comprise the major portion of the surface area of the belt, the cover has substantially the abrasive strength of a three-ply flat fabric cover.

Figure 3:
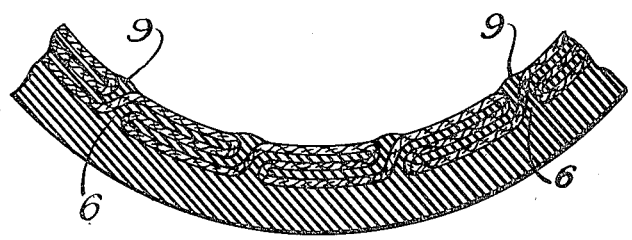
Fig. 3 is a similar view showing the pleated cover subjected to compression.

It will be noted that the single ply 8, which comprises the connection between adjacent pleats, is flanked by bodies of plastic material 6 and 9 whereby the connecting member 8 functions as a resiliently reinforced yield area between adjacent pleats. Thus, when the belt 1 is wrapped around a pulley (not shown) the yield area, comprising the connecting portions 8 and plastic masses 6 and 9, tend to relieve tensional stress from the fabric itself, if the belt is so wrapped as to apply tension to the cover side. If the belt is so wrapped around the pulley as to apply compression to the cover side thereof, the yield areas tend to absorb the buckling stress, as is illustrated in Fig. 3, wherein it is shown that the buckling occurs principally in the vicinity of the masses 9. At the same time the belt is stiffened by the three plies comprising the pleats against transverse flexing.

Referring particularly to Fig. 4, a pleated fabric component 10 is shown which comprises fabric plies 11, 12 and 13 at the pleats. The fabric comprising the component 10 carries a relatively thick coating 14 of rubber or rubber composition on one face thereof, whereas a relatively thin coating 14' is carried on the opposite face. The fabric comprising the component 10, when pleated, provides an unequal spacing of the plies 11, 12 and 13, plies 11 and 12 being separted by the relatively thin coatings 14' and plies 12 and 13 being separated by the relatively thick coatings 14. It is to be understood that the relatively thin coating 14' may be only of a thickness which might be obtained by saturation of the fabric, but for purposes of illustration it is shown as of a discernible thickness.

When the component 10 is employed as a belt cover, it is preferred that the plies 11 and 12 constitute the outermost plies of the cover component, as shown in Fig. 5. The pressing and vulcanizing operation, hereinbefore described tends to thin down or displace the heavy coating layer 14 on the outer face of the plies 11, said layer tending to flow into the body of the belt and particularly into the yield areas 15 between adjacent pleats.

In this form of the invention all of those attributes of flexibility, described in conjunction with belt 1 are present in belt 16 which carries component 10. In addition, the two plies 11 and 12 of the pleats are disposed closely adjacent the wear surface of the belt, that is, double fabric plies separated by a minimum of plastic material are disposed immediately adjacent the surface at which the greatest abrasive resistance is desired. Thus, the cover comprising the component 10, disposed in the manner described, has exceptionally high resistance to abrasion. Of course, if desired, the component 10 may be reversed relative to its position in the belt, that is, with the plies 13 outermost, but the position, first described above, is preferred. The flexibility of a belt having a differentially coated pleated fabric component may be controlled by the difference in the thickness of the coatings on opposite sides of the fabric. In general, the greater the differential in coating thickness of the opposite sides of the belt, the greater will be the flexibility of the belt.

Referring particularly to Fig. 6, the use of a pleated fabric as a cover and as reinforcement is shown. In said figure, 17 indicates a fragmentary portion of a so-called V-belt which comprises a carcass made up of pleated reinforced fabric layers 18 and strength members 19 embedded in rubber or rubber composition. The entire section of the belt 17 may be covered with pleated fabric which may, if desired, be disposed transversely to the length of the belt, as indicated at 20 and 21 in Fig. 6. If desired, the fabric may be disposed on the bias, but transverse disposition is preferred. As illustrated, the top portion of the cover may comprise plural layers of the pleated fabric, or, if desired, one or more such layers may be employed. The pleated fabric employed as a cover has all of the attributes of directional flexibility and abrasive resistance, hereinbefore described.

As an embedded reinforcement the pleated fabric layer 18 serves to impart directional flexibility and directional stiffness to the body of the belt; that is flexure along the yield areas connecting adjacent pleats is accomplished in a relatively facile manner whereas flexure at right-angles thereto is greatly resisted.

Referring particularly to Fig. 7, the use of pleated fabric 22 is shown as constituting a cover for a conveyor belt 23. The pleated fabric is shown as covering one flat face and two side edges of the belt, but it is to be understood that the cover may completely embrace the belt or may be disposed only on one or both flat faces, as desired. In employing the pleated fabric 22 for a cover of a conveyor belt, the fabric on the flat face or faces of the belt may be disposed with the pleats extending longitudinally of the belt, as shown at 24, or the pleats may be disposed on the bias. Here, again, the advantages of directional flexibility and abrasive resistance obtain.

It is apparent that herein is provided a belt component for power transmission belts or conveyor belts which can be employed to advantage as a cover or an embedded reinforcement. The characteristic of directional flexibility and directional stiffness may be employed to advantage, that is, the pleats may be disposed either transverse, longitudinal or on the bias on or in the belt, depending upon the direction in which flexibility or stiffness is desired. As a belt cover greater abrasive resistance is offered than that of a flat fabric cover with the added feature of greater flexibility in a desired direction. The pleats may be of the side pleat type or of the box pleat type, as desired, but it is preferred that in either case the planes of the folded or pleated plies be disposed substantially parallel to the exterior surfaces of the belt.

We claim as our invention:

1. A belt comprising a body of flexible, resilient plastic material of substantially uniform thickness and having substantially parallel opposite outer surfaces, a component for said belt comprising a fabric having a plurality of pleated folds which are narrow relative to the width and length of the belt, said fabric being substantially integrally carried by the body of the belt with the planes of the pleats disposed substantially parallel to an outer surface of the belt body.

2. A belt comprising a body of flexible, resilient rubber-like material of substantially uniform thickness and having substantially parallel opposite outer surfaces, a component for said belt comprising a fabric having a plurality of pleats which are narrow relative to the width and length of the belt, said pleated fabric being substantially integrally carried by the body of the belt with the planes of pleats disposed substantially parallel to an outer surface of the belt body and with said pleats comprising a fabric cover for said surface.

3. A belt comprising a body of flexible, resilient plastic material of substantially uniform thickness and having substantially parallel opposite outer surfaces, a component for said belt comprising a pleated fabric having a plurality of substantially parallel pleats which are narrow relative to the width and length of the belt, said pleated fabric being substantially embedded in the body of the belt with the planes of the pleats disposed substantially parallel to an outer surface of the belt body.

4. A belt comprising a body of flexible, resilient plastic material of substantially uniform thickness and having substantially parallel opposite outer surfaces, a component for said belt comprising a fabric having a plurality of pleats, said fabric being substantially embedded in the body of the belt with the planes of the pleats disposed substantially parallel to an outer surface of the belt body and with one ply of each pleat substantially exposed at said surface of the belt and comprising a cover for said surface.

5. A belt comprising a body of flexible, resilient rubber of substantially uniform thickness and having outer surfaces, a component for said belt comprising a rubberized fabric carrying a greater quantity of rubber on one surface than on the opposite surface thereof, said rubberized fabric being pleated, said pleated component being substantially integrally carried by the body of the belt with the planes of the pleats disposed substantially parallel to an outer surface of the belt body.

6. A belt comprising a body of flexible, resilient rubber of substantially uniform thickness and having outer surfaces, a component for said belt comprising a rubberized fabric carrying a greater quantity of rubber on one surface than on the opposite surface thereof, said rubberized fabric being pleated, said pleated component being substantially integrally carried by the body of the belt with outer plies of adjacent pleats being disposed adjacent and parallel to an outer surface of the belt body to provide a fabric cover for said surface.

7. A belt comprising a body of flexible, resilient rubber of substantially uniform thickness and having outer surfaces, a component for said belt comprising a rubberized fabric carrying a greater quantity of rubber on one surface than on the opposite surface thereof, said rubberized fabric being pleated, said pleated component being substantially integrally carried by the body of the belt with outer plies of adjacent pleats being disposed adjacent and parallel to an outer surface of the belt body and with the outer surfaces of said outer plies comprising that side of the fabric which carries the greater quantity of rubber.

8. A conveyor belt of substantially uniform thickness comprising a body of flexible resilient material having opposite substantially mono-planar outer surfaces, a component for said belt comprising a pleated fabric having portions embedded in the body of said belt adjacent one of said outer surfaces, the planes of the pleats of said component being disposed substantially parallel to said outer surfaces, and the length of said pleats being disposed substantially parallel to the length of the belt.

References Cited in the file of this patent

UNITED STATES PATENTS

| | | |
|---|---|---|
| 975,560 | Metzler | Nov. 15, 1910 |
| 1,920,482 | Toulmin | Aug. 1, 1933 |
| 2,073,668 | Wilson | Mar. 16, 1937 |
| 2,392,373 | Freedlander | Jan. 8, 1946 |
| 2,620,016 | Adams | Dec. 2, 1952 |

FOREIGN PATENTS

| | | |
|---|---|---|
| 21,878 | Great Britain | 1910 |